United States Patent [19]
Laubier

[11] 4,078,521
[45] Mar. 14, 1978

[54] PROCESS FOR THE CONTROLLED BREEDING OF PENAEIDES PRAWNS

[75] Inventor: Annie Laubier, St. Renay, France

[73] Assignees: Centre National pour l'Exploitation des Oceans, Trohare-LocMaria Plouzane; Agence Nationale de Valorisation de la Recherche (ANVAR), St. Renay, both of France

[21] Appl. No.: 697,369

[22] Filed: Jun. 18, 1976

[30] Foreign Application Priority Data

Apr. 26, 1976 France .................... 76 12324

[51] Int. Cl.² .................... A01K 61/00
[52] U.S. Cl. .................... 119/2
[58] Field of Search .................... 119/2, 4, 3, 5

[56] References Cited

U.S. PATENT DOCUMENTS

| | | | |
|---|---|---|---|
| 3,473,509 | 10/1969 | Miyamura | 119/2 |
| 3,477,406 | 11/1969 | Fujinaja | 119/2 |
| 3,735,736 | 5/1973 | Yee et al. | 119/2 |

*Primary Examiner*—Hugh R. Chamblee
*Attorney, Agent, or Firm*—Melville, Strasser, Foster & Hoffman

[57] ABSTRACT

The process of the invention consists in placing immature prawns in tanks containing water and sand at a starting temperature in the range of about 14° to 18° C and with daily lighting for about 8 to 13 hours, in progressively increasing the said temperature to an optimal value in the range of between 20° and 26° C, the increase in temperature being applied for at least about 3 months, in simultaneously and progressively increasing the said daily lighting to an optimal value in the range of about 13½ to 16 hours, in feeding the prawns daily and to repletion with steroid-rich substances and in then maintaining the optimal conditions of temperature and lighting the entire duration of oviposition.

Ovipositions of prawns may be obtained all the year according to the process of the invention.

10 Claims, 1 Drawing Figure

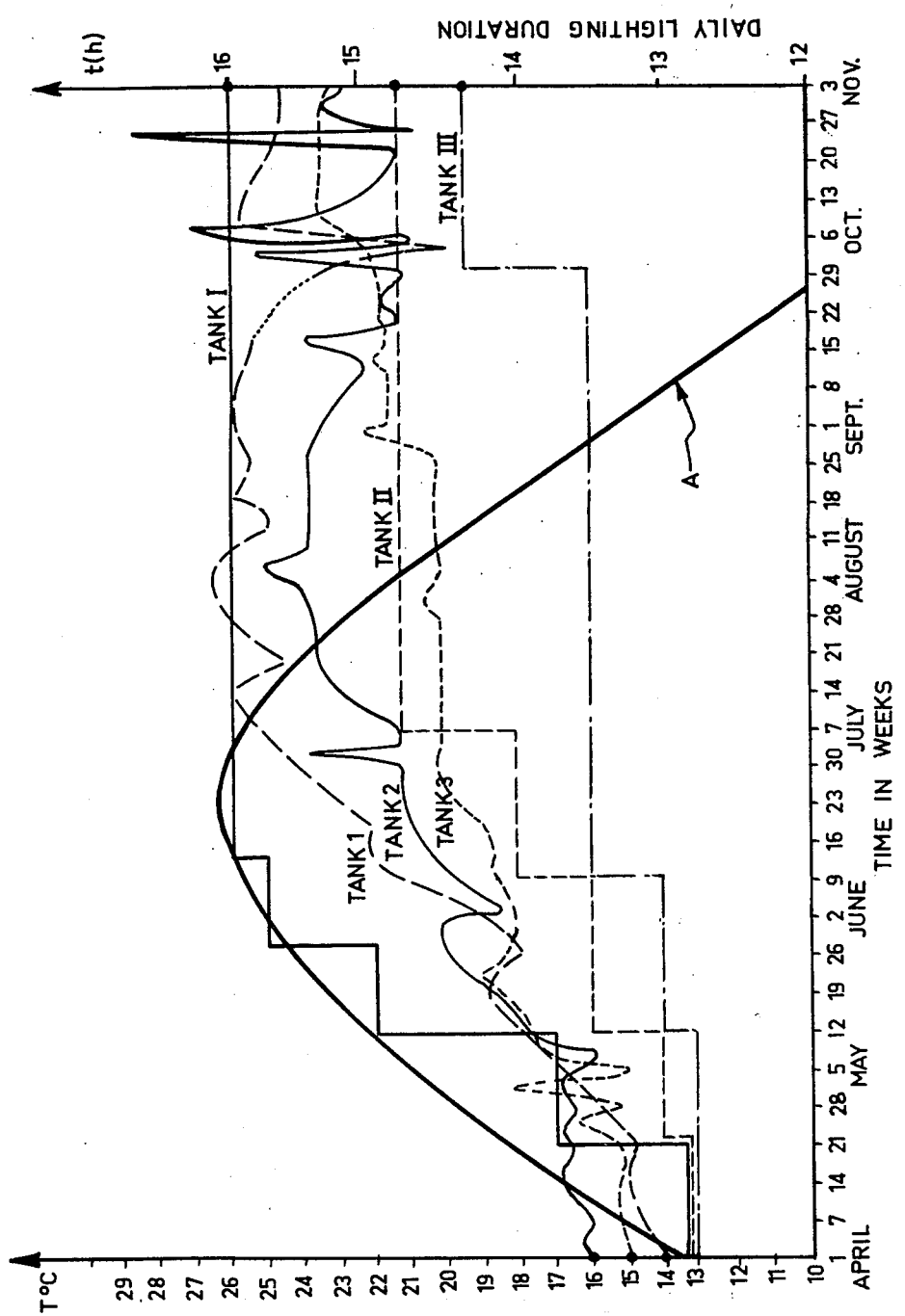

PROCESS FOR THE CONTROLLED BREEDING OF PENAEIDES PRAWNS

The present invention relates to a process for the controlled breeding of Penaeides prawns.

A considerable amount of work has been carried out on the breeding of Penaeides prawns and in particular *Penaeus japonicus,* Bate 1888, and the interest aroused by this problem in the past is still alive today [M. Fujinaga, Rep. Hayatomo Fish. Res. Lab, I(1), 1935, p. 1–51]. One of the main problems met with in the development of commercial Penaeides prawn rearings, is how to obtain oviposition at a predetermined period of the year, and notably outside the natural period of reproduction. However, research into the problem of obtaining sexual maturity in captivity has yet only been partially sucessful [in respect to this point, reference may be made to D. C. Tabb et al. Univ. Miami Sea Grant Special Bulletin 7, 1972, p. 1–59; Anonymes (Aquacop) Sixth Annual Meeting of the World Mariculture Society, 1975; D. W. Moore Jr. et al. Fifth annual meeting of the World Mariculture Society 1974].

In the case of *Penaeus japonicus,* the annual production of hundreds of millions of young prawns for commercial rearings is still completely dependent on fishing wild gravid females as is mentioned in the following articles : [M. Fujinaga, F.A.O. Fisheries Report n° 57, 3, 1969, p. 811–832, and K. Shigeno, Association for international technical Promotion edit., Tokyo, 1975, 153 pp.]

In addition, it is known that maintaining optimal conditions beyond the natural oviposition season results in the aquisition of a characteristic tropical type sexual behaviour [C.R. Acad. Sci. Paris vol. 281 (22-12-1975)]. The results given in this report cover a three and a half month period after the start of the oviposition; a mean temperature of 24° C and a mean light period of 14h 45 minutes are given as being suitable.

It has now been found that in order to obtain sexual maturity and oviposition of prawns in a controlled environment under tropical conditions, said prawns must be subjected to a temperature gradient and a lighting gradient for at least 3 months until an optimal temperature in the range of about 20° C to 26° C and an optimal photoperiod of between 13½ and 16 hours per day are obtained, and said optimal conditions must be maintained for the entire oviposition period. The nature of the food Penaeides prawns are provided with in a controlled environment was also found to be critical.

The object of the present invention is therefore a process for the controlled breeding of prawns under tropical conditions, said process comprising the steps of : 1) putting immature prawns in tanks containing water and sand at a starting temperature in the range of about 14° to 18° C and with about 8 to 13 hours lighting per day, in progressively increasing said temperature to an optimal value in the range of about 20° to 26° C, the increase in temperature being effected for at least about 3 months, in simultaneously and progessively increasing said daily lighting to an optimal value in the range of about 13½ to 16 h, in feeding the prawns daily to repletion with steroid-rich substances, and in then maintaining optimal temperature and lighting conditions throughout oviposition.

Prawns which are suitable to the purposes of the present invention are prawns which grow naturally under tropical conditions; said prawns should be about 10 months old and preferably weigh at least about 25 g. The relative number of males and females should be about 50:50 ; this is necessary due to the fact of the existence of relatively short periods of sexual function of males during the intermoult cycle of prawns. The prawns should, of course, be in good health. As an example of Penaeides prawns, which can be used in the process of the invention, it may be mentioned Penaeides prawns of the intertropical and subtropical coastal zone, and notably *Penaeus japonicus* Bate 1888 which is an Indo-pacific intertropical species; the most northern portion of its area of distribution is the Inland Sea of Japan. The sexual behaviour of this species of prawn differs from zone to zone; in the intertropical region, reproduction takes place all the year round as it is the case with other coastal Penaeides; in Japan, on the other hand, the period of reproduction starts in April for the most southerly period region and ends in September.

The tanks containing water and sand, which can be used according to the invention, should be sufficiently big to enable the prawns to grow, it will be easy for one skilled in the art to determine the size of the tanks, the amounts of water and sand or sediment according to the number of prawns put to breed in each tank. As an example it should be mentioned that, for a total number of about 50 prawns, it is advantageous to have a depth of at least one meter of water above the sediment and to have tank diameters of at least three meters. The sediment should be homogenous with an average fraction advantageously in the range of 500 to 800 m$\mu$. It must be stressed that in no case the sediment should be subjected to reduction phenomena and compression. Said tanks should obviously be equipped with water circulation and aeration means, a draining device and a device for collecting eggs.

Advantageously, the sand is placed on a sheet of synthetic material to enable the animals to bury themselves in the normal manner during the day time.

The water in the tanks should have a saltness between about 34 and 36 g/l, and preferably from 35.10 to 35.30 g/l; the pH value of the water should be approximately between 8 to 8.5, and preferably from 8.1 to 8.2; the amount of dissolved oxygen must be at least about 80 % and preferably about 95 to 105 % of saturation measured in the water and not at sand level.

The starting temperature must be in the range of about 14° to 18° C, for example about 15° C.

The temperature gradient to which the prawns are subjected must be such that an optimal temperature of about 20° to 26° C, and preferably about 25°–26° C is reached in at least about 3 months.

It is necessary for the temperature gradient to be applied for a minimal period of about 3 months for all the animals to attain sexual maturity; periods shorter than 3 months do not permit sexual maturity to be reached; longer periods may be adopted but they are not economical; in a series of experiments it was shown that under these conditions the fertility of the females was lower than that obtained under optimal conditions.

According to one embodiment of the invention it is particularly advantageous to maintain the above-mentioned parameters at a substantially constant value within the ranges given above; on incompletely mature females temperature variations of about 3° to 5° C or variations in salinity of about 5 to 8 g/l appear likely to induce emission of eggs which are generally not viable.

Simultaneously, the daily lighting gradient applied should be such that lighting attains an optimal value of about 13½ to 16 hours per day and preferably about 15½ to 16 hours, after at least 3 months.

As above mentioned, the starting daily lighting period lies in the range of about 8 to 13 hours; this means that the process of the invention can be carried out both in winter, when prawns maintained under natural conditions receive daily lighting of about 8 to 10 hours in temperature climates, and in another period of the year when the prawns can, before the process of the invention, be maintained under natural conditions where they receive about 12 to 13 hours daily lighting.

The daily lighting intensity should obviously neither be too strong nor too weak; it should be such that tropical conditions are respected. For an example, it will be indicated that, for a tank with a surface area of about 6.6 m$^2$, fluorescent tubes, totalizing 14,600 lumens, hung 50 cm above the surface of the water and providing 500 to 1500 lux on the surface, give suitable light.

Optimal conditions of temperature and lighting are then maintained throughout oviposition. It will be pointed out that the particularly preferred optimal conditions of the invention are 25°–26° C and 15½ to 16 hours lighting.

As it was previously stated, the nature of the food for the prawns is critical according to the invention; it is necessary for the prawns' food to be rich in steroids. Without wishing to be bound by any particular theory, it is thought that crustacea are incapable to synthetize steroids, notably the steroids necessary for breeding. Mussels may be mentioned among the steroid-rich substances suitable to the invention; trials using crab meat to feed prawns showed that it was not suitable.

Trials conducted with *Penaeus japonicus* according to the invention demonstrated that the first signs of maturity appear about one month after starting to employ the process of the invention, and that the first oviposition takes place about 2 months after these signs of maturity.

The ovipositions which were obtained during these trials were excellent as all the resulting rearing of larvea gave good results; now, it should be noted that the Japanese technique gives about 40 to 60 % eggs which do not hatch [in this connection see K. Shigeno, Association for internation technical Promotion edit. Tokyo, 1975, 153 pp]. It should also be noted that when prawns are subjected to the conditions of the invention it is possible to obtain ovipositions practically throughout the year.

According to one embodiment of the process of the invention additional ovipositions may be obtained by isolating mature, fecundated females, that is to say, as soon as optimal conditions have been reached, and by placing them in darkness for 1 to 6 days at a temperature of approximately 29° C according to one embodiment of the method commonly used in Japanese commercial hatcheries to induce oviposition of wild females.

The invention will now be described in greater detail in the following non-limiting example.

EXAMPLE a. experiment tanks

In this example three identical tanks were used in order to carry out three trials simultaneously varying the temperature and photoperiods independantly; said cylindrical tanks were 2.90 m in diameter and 1.50 m in height and provided with a double bottom communicating with a draining device by an adjustable external overflow pipe. An air inlet from the bottom of the tank and directed upwards was provided to ensure water circulation and aeration; the amount of air introduced was in correlation with the volume of the double bottom. A 10 cm thick layer of sand deposited on a synthetic felt fabric permitted the animals to bury themselves normally during the day; the free water above the said sand was 1 m in depth, this corresponding to a volume of water of 6.6 m$^3$. The circulation of water in each tank was carried out in a semi-closed system; 450 l/h of water was supplied, upstream said water flowed through a heating tank wherein its temperature was adjusted to a desired value by means of a set of heating resistances in silica sheaths. The temperature of the water in the tanks was permanentaly recorded by a thermograph at a distance.

Each tank was isolated separately and totally from outside light, and lighting was provided by fluorescent tubes suspended 50 cm above the water totalizing 14,600 lumens and giving 500 to 1500 lux on the surface according to the zone. The amounts of light provided daily were controlled by three time switches.

As soon as the first ovipositions were observed in the tanks the draining was modified in order that larvae could be easily recovered; a superficial overflow pipe discharged into an adapted collector or a fish egg incubator equipped with a 180 micron mesh bag.

b. the animals

The animals used in the experiment were obtained from post-larvae of the species *Penaeus japonicus* imported from Japan at the end of the month of May. They belonged to two classes, some 23 months old and the other 11 months old when the process was brought into operation on the 1st April 1975 (dates of birth adjusted to the begining of the month of May each year). Before the process was used the animals were kept in ponds out doors and some of the older ones were maintained for 10 months at a temperature of about 17° to 18° C. On the 1st April 1975, 149 prawns were divided between the three experiment tanks as follows:

|  | tank 1 | tank 2 | tank 3 |
| --- | --- | --- | --- |
| 1 year-old males | 18 | 17 | 5 |
| 2 year-old males | 4 | | 4 |
| 1 year-old females | 20 | 18 | 4 |
| 2 year-old females | 4 | 5 | 4 |
| sex unknown | 3 | 5 | 34 |
| Total | 49 | 49 | 51 |

Owing to shortages in the pond after the first larval development, 7 two year old males (average weight 36 g) and 4 two-year old females (average weight 54.7 g) were added to the initial stock in tank 3 on the 11th of August.

On the 1st of April the mean weight of the 2 year-old animals was 32 g and that of the one year-old animals was 12 g, these relatively light weights being proof of unfavorable rearing conditions. During the trial (1st April to 10th November), natural mortality was limited to the initial three week period of adaptation and, for all the tanks, amounted to 4 animals, i. e about 3 %. Thereafter, the deaths observed were either accidental (leaping out of the tank) or due to samples taken for histological studies. The composition of the populations on the 10th November were as follows:

|  | tank 1 | tank 2 | tank 3 |
| --- | --- | --- | --- |
| Males (number-weight) | 21 – 45,6 g | 14 – 44 g | 26 – 44,7 g |

| | tank 1 | tank 2 | tank 3 |
|---|---|---|---|
| Females (number-weight) | 18 – 67,6 g | 18 – 59,3g | 24 – 63,6 g |

It was no longer possible to recognize infallibly all the 2 year-old females but about twelve animals weighing between 75 and 96 g certainly belonged to this category.

On the 10th November, the load was 407 g/m$^2$ in tank 3, 329 g/m$^2$ in tank 1 and 255 g/m$^2$ in tank 2.

The animals were fed daily to repletion with mussel flesh. The food is given normally in the late afternoon. Food scraps were removed each morning.

c. Physico-chemical factors

Water salinity was from 35.10 to 35.30 g/l; the water had a pH value of 8.1 to 8.2 and an amount of dissolved oxygen amounting to 95 – 105 % saturation measured in the water and not at sediment level.

The starting temperature of the water was about between 14° and 16° C and the daily duration of lighting was about 12 hours. The variations of temperature and photoperiods applies to the three tanks are shown in the single appended FIGURE in which the temperature in degrees Celsius is shown on the ordinate axe on the left, the duration of daily lighting on the ordinate axe on the right and the time in weeks in abscissa; line A shows the interval between sunrise and sunset (mean value for France).

Insofar as temperature is concerned, a certain number of failures will be noted on the FIGURE; these are due to defective insulation of the resistances and to problems relating to the homogenization of the water mass in the heating tank; they show, moreover, that optimal conditions according to the invention may vary within the range previously indicated, but it is preferable to maintain the temperature at a substantially constant value, as was previously stated.

As may be observed from the FIGURE, tank 1 is a hot tank with a long photoperiod (26° C and 16 h lighting on the 21st June), tank 2 is a cold tank with a short photoperiod (20° C and 13h 30 daily lighting on the 21st June) and tank 3 is an intermediate tank (24° C and 14h 45 daily lighting on the 21st June).

d. Results

1. Maturation

The animals used in the present trial were not examined systematically in order to avoid disturbing the breeding process. All the females of the 1974 group were immature at the start of the trial; females of the 1973 group had ovaries which were invisible in transparence but filiform. The first signs of maturation were observed at the end of April in a 1973 group from tank 2 after dissection (yellow ovaries). On the 12th June a 2-year-old dissected female had orange ovaries with a gonado-somatic ratio of 6. At the end of June all the females observed in the three tanks had well developed ovaries which were of varying degrees of darkness when observed in transparency. During a general check on the 10th November a large proportion of females were maturing or ready to oviposit judging by the colour and form of the ovary, 12 out of 18 in tank 1, 13 out of 18 in tank 2 and 18 out of 24 in tank 3. The appearance of the ovaries of the remaining females was very similar to that of one of the females which laid a large number of eggs following a rise in temperature (induced oviposition).

2. Ovipositions in the experiment tanks

The first oviposition was observed on the 12th July in tank 2; larvae at the zoea 1 stage corresponded to an oviposition occurring in the night of the 9th to 10th July. The first oviposition occurred a few days later in the other two tanks. The devices for collecting eggs were put in place as soon as the first oviposition was observed. In the case of these experiements the term "oviposition" which refers to the simultaneous emission of eggs by several females, corresponds simply to all the eggs or larval stages which, according to the rates of development, were emitted during a period of time of several hours. In any case the number of ovipositions given is a minimal total. Collection of a determined oviposition may extend over several days, as is seen from the examples below :

Oviposition n° 14 of tank 2, on Aug. 6, 1975: on Aug. 6, at 9 a.m.: 3,000 eggs; on Aug. 6 at 4 p.m.: none; on Aug. 7 at 9 a.m. 14,000 nauplii III; on Aug. 7 at 4 p.m.: 850 nauplii IV; on Aug. 8 at 9 a.m.: 2500 nauplii V; on Aug. 8 at 4 p.m.: 150 nauplii VI; on Aug. 9 at 9 a.m. 350 zoea 1, making a total of 20,850.

Oviposition n° 19 of tank 2, on Sept. 4, 1975: on Sept. 4 at 9 a.m.: 5,500 eggs; on Sept. 5 at 9 a.m. 40,000 nauplii III; on Sept. 6 at 9 a.m.; 7,000 nauplii V; on Sept. 7 at 9 a.m.: 200 zoea 1; making a total of 52,700.

After recovering the larvae in the collector and adjusting the sampling to a volume of approximately 200 to 500 ml, the counting was effected on a sample taken in a pipette after agitation (1/100 to 1/50th of the total volume).

During the period from the 10th July 1975 to the 29th February 1976, or more than seven and a half months, 99 ovipositions were observed in tank 1, 106 in tank 2 and 77 in tank 3 (the greater part of these ovipositions occurred after the photoperiod and temperature were increased in the tanks). Ovipositions still continued in March 1976. The average number of eggs or larvae per oviposition for each tank was 25,329 for tank 1, 14,768 for tank 2 and 11,509 for tank 3 (table 1). 100 % of the eggs obtained always hatched, and the ovipositions raised to form future batches of breeding stock also developed well. Under conditions which were far from optimal conditions for larvae rearing, the first oviposition of the 10th July gave more than 1,000 post-larvae with a survival rate of 18%; these animals weighed between 15 and 28 g individual weight seven and a half months after hatching.

Table I shows the number of eggs or larvae collected per oviposition for each tank.

3. Induced ovipositions

With the method used in Japanese commercial hatcheries to obtain oviposition of wild females, two additional ovipositions were obtained by isolating mature females of the 1973 group. The first oviposition was obtained with a female from tank 2 weighing 92 g. When placed in a 800 l tank heated to 29° C and in darkness, this female laid 455,000 eggs during the first night following its isolation (night of the 18th to 19 September); the hatching rate of these eggs was higher than 98 %. About ten days later a 90 g female from tank 1 was isolated under the same conditions. During the third and fourth nights after being isolated (nights of the 12th to the 13th and 13th to the 14th October) it laid 80,000 then 79,000 eggs, making a total of 159,000 eggs.

The oviposition of *Penaeus japonicus* is unknown under natural conditions. Under the conditions of rearing according to the invention oviposition is distinctly sequential : in tank 2, 22 females (maximal figure as it corresponds to the date 10th July) provided 106 ovipositions (not including the induced oviposition of the 19th September); in tank 1, 23 females provided 99 ovipositions and if the state of the females is anything to go by this figure is far from being the final one. As to the number of eggs per oviposition, the ecological conditions obtaining in tanks 1 and 2 during the first part of the experiment (July - early October) were markedly better than those in tank 3; a certain precocity was observed as to the total number of eggs obtained in tank 2, but tank 1 gave distinctly better results as to the mean number of eggs per oviposition. Finally, all the ovipositions obtained were excellent whereas according to Shigueno (see above) the Japanese method using wild females only gave a hatching rate of 40 to 60 %, a biologically abnormal percentage.

The above trials show that it is possible to interfere the period of oviposition. The animals used in this experiment would have breed naturally at one year of age under natural Japanese conditions, that is, in May or at the latest in June-July. But the ovipositions obtained by the process of the invention continued for 8 months.

The process of the invention provides commercial *Penaeus japonicus* rearings with considerable advantages when they are dependent upon the availability of postlarvae as soon as the water in which prawns live starts to warm up.

TABLE I
NUMBER OF EGGS OR LARVAE OBTAINED PER OVIPOSITION FOR EACH TANK

| Dates | TANK I Oviposition | TANK I Number of individuals obtained | TANK II Oviposition | TANK II Number of individuals obtained | TANK III Oviposition | TANK III Number of individuals obtained |
|---|---|---|---|---|---|---|
| July 10 | | | 1st | 7100 | | |
| July 14 | 1st | 1340 | 2nd | 10,490 | | |
| July 15 | | | 3rd | 11,560 | 1st | not counted |
| July 16 | | | 4th | 11,150 | 2nd | not counted |
| July 18 | 2nd | 19,700 | | | | |
| July 19 | 3rd | 12,000 | 5th | 25,000 | | |
| July 20 | | | 6th | 59,800 | | |
| July 24 | 4th | 48,900 | 7th | 15,050 | | |
| July 25 | | | 8th | 51,100 | 3rd | 14,250 |
| July 26 | 5th | 46,950 | | | | |
| July 28 | | | 9th | 24,970 | 4th | 8070 |
| July 29 | 6th | 9300 | | | | |
| July 30 | | | 10th | 11,600 | 5th | 1250 |
| July 31 | 7th | 8870 | | | | |
| August 01 | | | 11th | 6420 | | |
| August 02 | 8th | 10,250 | 12th | 30,920 | | |
| August 04 | | | | | 6th | 150 |
| August 05 | | | 13th | 10,700 | | |
| August 06 | | | 14th | 20,850 | | |
| August 28 | 9th | 20,300 | | | | |
| August 30 | 10th | 3000 | 15th | 10,500 | | |
| | | | 16th | 11,500 | | |
| August 31 | | | 17th | 22,500 | | |
| September 02 | | | 18th | 13,700 | | |
| September 03 | 11th | 9500 | | | | |
| September 04 | 12th | 3900 | 19th | 52,700 | | |
| September 10 | | | 20th | 200 | | |
| September 12 | | | | | 7th | 7330 |
| September 13 | 13th | 4930 | | | | |
| September 14 | 14th | 37000 | 21th | 11500 | | |
| September 18 | | | 22nd | 10600 | 8th | 800 |
| September 21 | | | 23rd | 14,400 | | |
| September 22 | 15th | 8200 | 24th | 34400 | 9th | 900 |
| September 23 | 16th | 11400 | | | | |
| September 24 | | | 25th | 29,300 | | |
| September 26 | 17th | 1000 | | | | |
| September 28 | 18th | 13,300 | 26th | 600 | | |
| | | | 27th | 100 | | |
| October 04 | | | 28th | 13,300 | | |
| October 07 | 19th | 750 | | | | |
| October 08 | 20th | 18,150 | | | | |
| October 12 | | | | | 10th | 3750 |
| October 13 | | | | | 11th | 3500 |
| October 14 | | | | | 12th | 5600 |
| October 15 | | | 29th | 19,200 | | |
| October 16 | 21st | 1000 | 30th | 27,700 | | |
| October 17 | 22nd | 6700 | | | | |
| October 19 | | | 31st | 11,150 | 13th | 7300 |
| October 21 | | | 32nd | 1150 | | |
| October 22 | | | 33rd | 9500 | 14th | 1600 |
| October 25 | | | 34th | 2000 | | |
| October 27 | 24th | 58,500 | 35th | 17,250 | | |
| October 28 | | | | | 15th | 4350 |
| October 29 | 25th | 35,800 | 36th | 8400 | 16th | 4650 |
| | | | 37th | 24,800 | | |
| October 30 | 26th | 14,200 | 38th | 79,750 | 17th | 1400 |
| October 31 | 27th | 83,000 | | | 18th | 11,900 |
| November 01 | | | 39th | 7500 | | |
| November 02 | | | 40th | 25,050 | | |
| November 03 | 28th | 11,250 | 41st | 5900 | | |
| TOTAL | 28 | 501,890 | 41 | 744,110 | 18 | 76,800 |

I claim:

1. A process for the controlled breeding of Penaeides prawns under tropical conditions, which essentially consists in : 1) putting immature prawns in tanks containing water and sand at a starting temperature in the range of about 14 to 18° C and with a daily lighting lasting for about 8 to 13 hours; 2) progressively increasing said temperature to an optimal value in the range of about 20° to 26° C, the increase in temperature being applied for about 3 months, 3) simultaneously and progressively increasing said daily lighting period to an optimal value of about 13½ to 16 hours, 4) feeding the prawns daily to repletion with steroid-rich substances and 5) then maintaining the optimal temperature and lighting conditions during the entire duration of oviposition.

2. Process according to claim 1, wherein the prawns are Penaeides prawns of the intertropical and subtropical coastal zone.

3. Process according to claim 2, wherein said prawns are *Penaeus Japonicus*.

4. Process according to claim 1, wherein the optimal daily lighting period lies in the range of 15½ to 16 hours and the optimal temperature is 25° to 26° C.

5. Process according to claim 1, wherein the lighting is such that it has an intensity of between 500 and 1,500 lux on the surface.

6. Process according to claim 1, wherein the water salinity is from 34 to 36 g/l.

7. Process according to claim 1, wherein the pH value of said water is 8 to 8.5.

8. Process according to claim 1, wherein the water contains dissolved oxygen at a rate of at least 80 % saturation measured in the water.

9. Process according to claim 1, wherein the prawns are fed with mussels as steroid-rich substances.

10. Eggs and larvae obtained by the process according to claim 1.

* * * * *